(12) United States Patent
Kudachi et al.

(10) Patent No.: US 12,739,147 B2
(45) Date of Patent: Sep. 15, 2026

(54) HANDLING MULTICAST DEVICE LATENCIES THROUGH SELECTIVE JOIN FORWARDING

(71) Applicant: Hewlett Packard Enterprise Development LP, Spring, TX (US)

(72) Inventors: Deepak S. Kudachi, Bengaluru (CA); Tathagata Nandy, Bengaluru (IN); Chethan Chavadibagilu Radhakrishnabhat, Bengaluru (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 393 days.

(21) Appl. No.: 18/362,710

(22) Filed: Jul. 31, 2023

(65) Prior Publication Data

US 2025/0047517 A1 Feb. 6, 2025

(51) Int. Cl.
*H04L 12/18* (2006.01)

(52) U.S. Cl.
CPC .................................. *H04L 12/185* (2013.01)

(58) Field of Classification Search
CPC .......................... H04L 12/185; H04L 12/1886
USPC .......................................................... 370/390
See application file for complete search history.

(56) References Cited

U.S. PATENT DOCUMENTS 8,131,867 B1 * 3/2012 Luby .................. H04L 12/1886 370/254
9,935,782 B1 * 4/2018 Rathi .................... H04L 49/201
2004/0090970 A1 * 5/2004 Sanchez .............. H04L 12/2801 370/409
2020/0328988 A1 * 10/2020 Jain ......................... H04L 45/66
2021/0392460 A1 * 12/2021 Gorkin .................. H04W 4/029

OTHER PUBLICATIONS

Christensen, M., et al. "Considerations for Internet Group Management Protocol (IGMP) and Multicast Listener Discovery (MLD) Snooping Switches" Request for Comments (RFC) 4541; May 2006 (Year: 2006).*

* cited by examiner

*Primary Examiner* — Stephen J Clawson
(74) *Attorney, Agent, or Firm* — Hewlett Packard Enterprise Patent Department

(57) ABSTRACT

A switch receives a first query which requests a response from all hosts in the network, wherein the switch is a next-hop switch of a first set of the hosts in a multicast group, wherein the first query is an Internet Group Management Protocol (IGMP) all-host query message, and wherein the first query is generated by an IGMP querying host and transmitted via one or more intermediate switches. The switch tracks join messages received from the first set of the hosts in response to the first query, wherein a respective join message indicates that a corresponding host is to remain in the multicast group. Responsive to determining that the tracked join messages meet a predetermined threshold, the switch consolidates the tracked join messages by forwarding a reduced number of join messages, thereby reducing a total number of join messages propagated to the IGMP querying host via the intermediate switches.

12 Claims, 5 Drawing Sheets

HANDLING MULTICAST DEVICE LATENCIES THROUGH SELECTIVE JOIN FORWARDING

BACKGROUND

Field

In an L2 multicast multi-tier network in which multiple hosts (such as Internet Protocol television (IPTV) receivers) are connected to multiple cascading switches, channel-switching may result in a degradation of the user experience (e.g., freezing frames). This may occur due to the low horsepower of certain switches as well as Internet Group Management Protocol (IGMP) functionality which can result in multiple Central Processing Unit (CPU) lookups for processing packets. In one example, a member or host may leave a multicast group, which can result in a series of messages exchanged between the hosts and an IGMP querying host via the cascading switches. These messages may experience cascaded propagation delays at each level (e.g., at each intermediate switch) between the host and the IGMP querying host. This may result in a time-out of the multicast group on the intermediate switches, which can result in a momentary traffic loss for the still-connected remaining hosts (e.g., channel freeze).

BRIEF DESCRIPTION OF THE FIGURES

In the figures, like reference numerals refer to the same figure elements.

DETAILED DESCRIPTION

Figure 1:
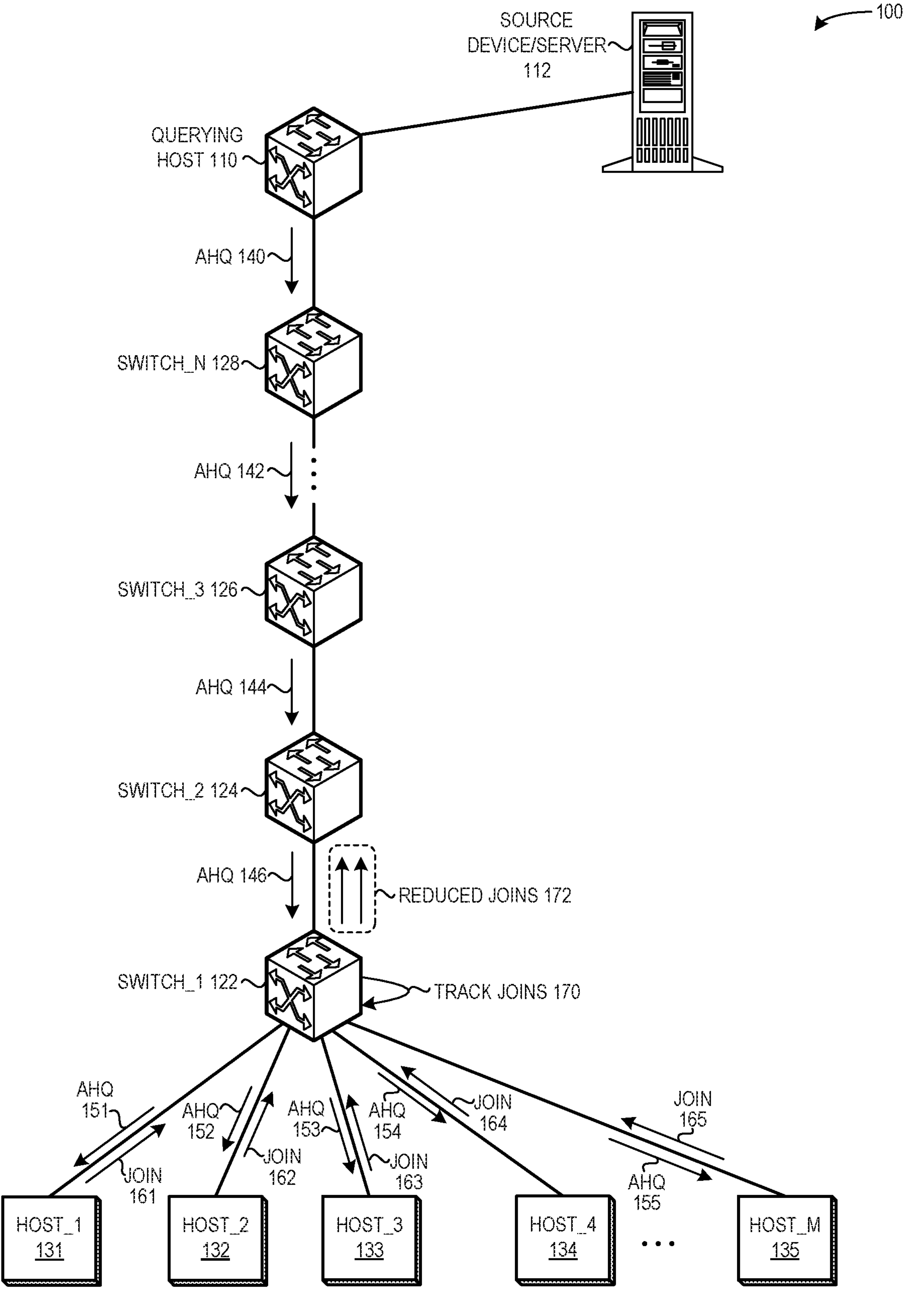
FIG. 1 illustrates an environment which facilitates reducing control plane traffic in a network, including selective join forwarding, in accordance with an aspect of the present application.

Aspects of the instant application can reduce control plane traffic in a network by providing selective join forwarding and a distributed querying host functionality, which can result in an improved user experience for channel-switching in a network with multiple hosts, e.g., members subscribed to a same multicast group, IPTV receivers watching a same channel, etc.

As described above, an L2 multi-tier network can include multiple hosts connected to multiple cascading switches ("intermediate switches"). The hosts may be subscribed to the same multicast group, e.g., IPTV receivers may be subscribed to or watching the same channel. Thus, a host which has subscribed to or joined a multicast group may have multiple devices which are cascaded, via one or more intermediate entities, towards an upstream querying host or a source streaming device. The intermediate entities may be, e.g., switches or routers with lower-end hardware capacity. A non-trivial amount of latency may accrue in these intermediate switches while handling control plane traffic related to the multicast data (e.g., streaming data to an IPTV receiver). This latency can increase proportionally with an increase in the number of cascaded intermediate switches between the host and the upstream querying host or the source streaming device. For example, query packets sent by the querying host may experience latency at all the cascaded levels, which can result in increased latency or delayed processing of multicast packets by the intermediate switches.

In IGMP, if a host wishes to leave a multicast group (e.g., if an IPTV receiver wishes to change the channel), a series of messages may be exchanged between the host and an IGMP querying host via the cascading switches. These exchanged messages may include: IGMP "leave" messages sent from the leaving host to the IGMP querying host via the intermediate switches; IGMP "group-specific queries" (GSQs) sent from the IGMP querying host to all hosts in the multicast group via the intermediate switches; and IGMP "join" messages sent from the other remaining hosts of the multicast group to the IGMP querying host via the intermediate switches.

The "leaving host" can send a leave message, which can be forwarded up to the querying host via the cascaded intermediate switches. Upon receiving the leave message, the querying host can send a group-specific query (GSQ) packet to the group on the port from which the leave message is received. As the leave message is propagated through each of the cascaded intermediate switches, each switch can set the leave-received port timer for the specific group to the Last Listener Query Interval (LLQI). In the case of IGMPv2/Multicast Listener Discovery (MLD) v2, each switch can set the port timer to LLQI upon receiving the leave message. The propagation latency added to the GSQ packet by each intermediate switch at all the cascaded levels may cause expiration of the port timer and removal of the membership port for the specified group because the expected join messages in response to the GSQ packet may also experience delay. This may result in a degradation of the user experience, including a brief traffic disruption for currently joined hosts which can result in issues, e.g., momentary screen freeze for IPTV users during channel-switching. This degradation in the user experience may be even more notable when the multicast group includes multiple member ports and the network includes a significant number of cascaded intermediate switches.

The described aspects of the instant application provide a system which can result in an improved user experience by reducing the amount of control plane traffic in a cascaded multi-tier network topology. The system can perform selective join forwarding as well as a distributed querying host functionality.

The term "Internet Group Management Protocol" or "IGMP" refers to a communication protocol used by hosts and adjacent network devices (such as routers and switches) on IPv4 networks to establish multicast group memberships. IGMP may be used in one-to-many networking applications (e.g., online streaming video, gaming, IPTV). While multicast management on IPv4 network may use IGMP, multicast management on IPv6 networks may use Multicast Listener Discovery (MLD). IGMP and MLD are described in further detail in Request for Comments (RFC) 4541, "Considerations for Internet Group Management Protocol (IGMP) and Multicast Listener Discovery (MLD) Snooping Switches."

The term "querying host" refers to a network device which can perform some of the functions of an IGMP centralized querying host. The functionality of the querying host can be implemented on a device separate from or the same as any of the intermediate switches or other network devices in the network. In aspects of this disclosure, the functionality of a querying host can be distributed, as described below in relation to FIGS. 2 and 4.

The term "all-host query" or "AHQ" refers to a query or message which requests a response from all hosts in a network. A querying host can send the AHQ periodically, e.g., at predetermined time intervals. A particular host which receives an AHQ can send back a "join" message indicating that the particular host desires to remain in the multicast group (i.e., continue to receive data sent from a source device). In aspects of this disclosure, join messages from multiple hosts in a multicast group in response to an AHQ can be tracked and consolidated by a network device other than the querying host, e.g., by a next-hop switch of the particular host, as described below in relation to FIGS. 1 and 3. Join messages sent in response to AHQ messages (i.e., to remain in the multicast group) can be referred to as "refresh join" messages or "report" messages, while join messages sent by a host to initially join a multicast group can be referred to as "new join" messages. In aspects of this disclosure, the term "join message" refers to a refresh join message.

The term "group-specific query" or "GSQ" refers to a query or message which is sent from a querying host to all hosts in a specific multicast group. A GSQ may be sent by a querying host in response to receiving a "leave" message from a host (i.e., the leaving host). In aspects of this disclosure, a GSQ can be sent by a network device other than the querying host, e.g., by a next-hop switch of the leaving host, as described below in relation to FIGS. 2 and 4.

The term "network device" refers to devices, components, units, or entities which can include multiple ports or interfaces for uplinks and can communicate with other network devices in the manner described herein. Examples of network devices can include routers and switches.

Environment which Facilitates Reducing Control Plane Traffic: Selective Join Forwarding FIG. 1 illustrates an environment 100 which facilitates reducing control plane traffic in a network, including selective join forwarding, in accordance with an aspect of the present application. Environment 100 can include: a source device/server 112 which sends data to subscribed hosts; a querying host 110 which can be a designated router, switch, or other network device responsible for, e.g., periodically sending queries in an IGMP environment; a plurality of network devices, e.g., intermediate switches including but not limited to a switch_1 122, a switch_2 124, a switch_3 126, and a switch_N 128; and a plurality of clients or hosts connected to a network device which serves as the next-hop switch for the connected clients or hosts, e.g., a host_1 131, a host_2 132, a host_3 133, a host_4 134, and a host_M 135, where hosts 131-135 are connected to switch_1 122 as their next-hop switch. While FIG. 1 only depicts hosts connected to switch_1 122, one or more hosts may be connected to any of intermediate switches 122-128, where a respective intermediate switch serves as the next-hop switch for those one or more hosts.

Querying host 110 may periodically send out an IGMP all-host query (AHQ) message to all hosts which are in the network. When the AHQ is received by a connected or subscribed host, the host can transmit a join message back to querying host 110. The join message can indicate that the host is still subscribed to the multicast group which receives data from source device 112 (i.e., the host is still watching a given channel on an IPTV). However, in a scaled network topology where multiple multicast clients or hosts are subscribed to multiple multicast groups (e.g., a multi-client port scenario), the AHQ sent by querying host 110 can trigger multiple join messages for the same multicast group, which can result in a significant amount of packets exchanged on the path between the clients and querying host 110. The potentially voluminous amount of join messages may increase the latency at all cascaded levels, which may contribute to the delayed handling of multicast packets by the intermediate network devices (e.g., switches 122-128), which in turn can result in decreased performance and efficiency in the network due to the significant amount of control plane traffic.

The described aspects address this issue by modifying the forwarding behavior of the intermediate network devices (i.e., the network devices such as intermediate switches 122-128 which are not querying host 110). Upon transmitting or forwarding an AHQ, each intermediate switch can track the join messages received in response to the forwarded AHQ. A respective switch can determine whether the tracked join messages meet a predetermined threshold. Upon determining that the tracked join messages meet the predetermined threshold, the respective switch can consolidate the tracked join messages and forward only a reduced number of join messages upstream.

The predetermined threshold can be based on a timer or a counter. In one aspect, the respective switch can maintain a timer based on forwarding the AHQ and receiving the join messages. The respective switch can track a number of received join messages in response to the AHQ. The respective switch can also determine an expiration of the timer. If the tracked number of received join messages exceeds a preconfigured number prior to or upon the expiration of the timer, the respective switch can determine that the tracked join messages meet the predetermined threshold and can forward only the reduced number of join messages upstream.

In another aspect, the respective switch can set a counter to a reduced number, such as a robustness variable associated with the IGMP querying host (e.g., querying host 110). The robustness variable can be configured on each device, including querying host 110 as well as non-querying devices (e.g., switches 122-128). The querying host can use the robustness variable when sending out queries (whether all-host queries or group-specific queries), while the non-querying devices can use the robustness variable to count or track the number of selective joins which need to be forwarded upstream towards the IGMP querying host. Upon receiving the query message (e.g., the AHQ) from the IGMP querying host, the respective switch can set the counter to the robustness variable. Subsequently, the respective switch can decrement the counter each time it receives a join message in response to the AHQ. If the counter reaches zero (e.g., prior to or upon the expiration of the timer), the respective switch can determine that the tracked join messages meet the predetermined threshold and forward only the reduced number of join messages upstream.

The reduced number of join messages forwarded upstream can correspond to a preconfigured number, e.g., the robustness variable associated with the IGMP querying host (e.g., querying host 110). An example value for the robustness variable can be "2," in which case when multiple join messages are received by the respective switch in response to an AHQ, only two join messages are forwarded upstream by the respective switch, thus reducing control plane traffic in the network.

For example, querying host 110 can transmit an AHQ 140 to all subscribed hosts in the network. AHQ 140 can pass through intermediate switches 128, 126, and 124 as, respectively, AHQ 142, AHQ 144, and AHQ 146. Upon receiving AHQ 146, switch_1 122 can send AHQs 151-155 to, respectively, hosts 131-135. Each of hosts 131-135 can respond with a join (e.g., respectively, joins 161-165), assuming that each of hosts 131-135 wishes to remain subscribed to the multicast group and continue receiving data from source device 112. Switch_1 122 can track joins 161-165 (operation 170), and upon determining that the predetermined threshold is met (e.g., via a timer, a counter, or both a timer and a counter, as described above), switch_1 122 can send reduced joins 172 upstream to switch_2 124. Reduced joins 172 indicate that the preconfigured reduced number of joins is set to "2," which is significantly less than the multiple joins that may be received by switch_1 122 in response to AHQs 151-155. Note that while only five joins (161-165) are depicted as being sent back in response to AHQs 151-155 from hosts 131-135, many more hosts may be part of the same multicast group and connected to switch_1 122. Furthermore, each intermediate switch of the cascaded levels may include multiple connected hosts subscribed to multiple multicast groups. Thus, tracking the joins (e.g., 170) and performing the selective join forwarding (e.g., 172) depicted in environment 100 can result in a significant reduction of control plane traffic in the network.

Figure 2:
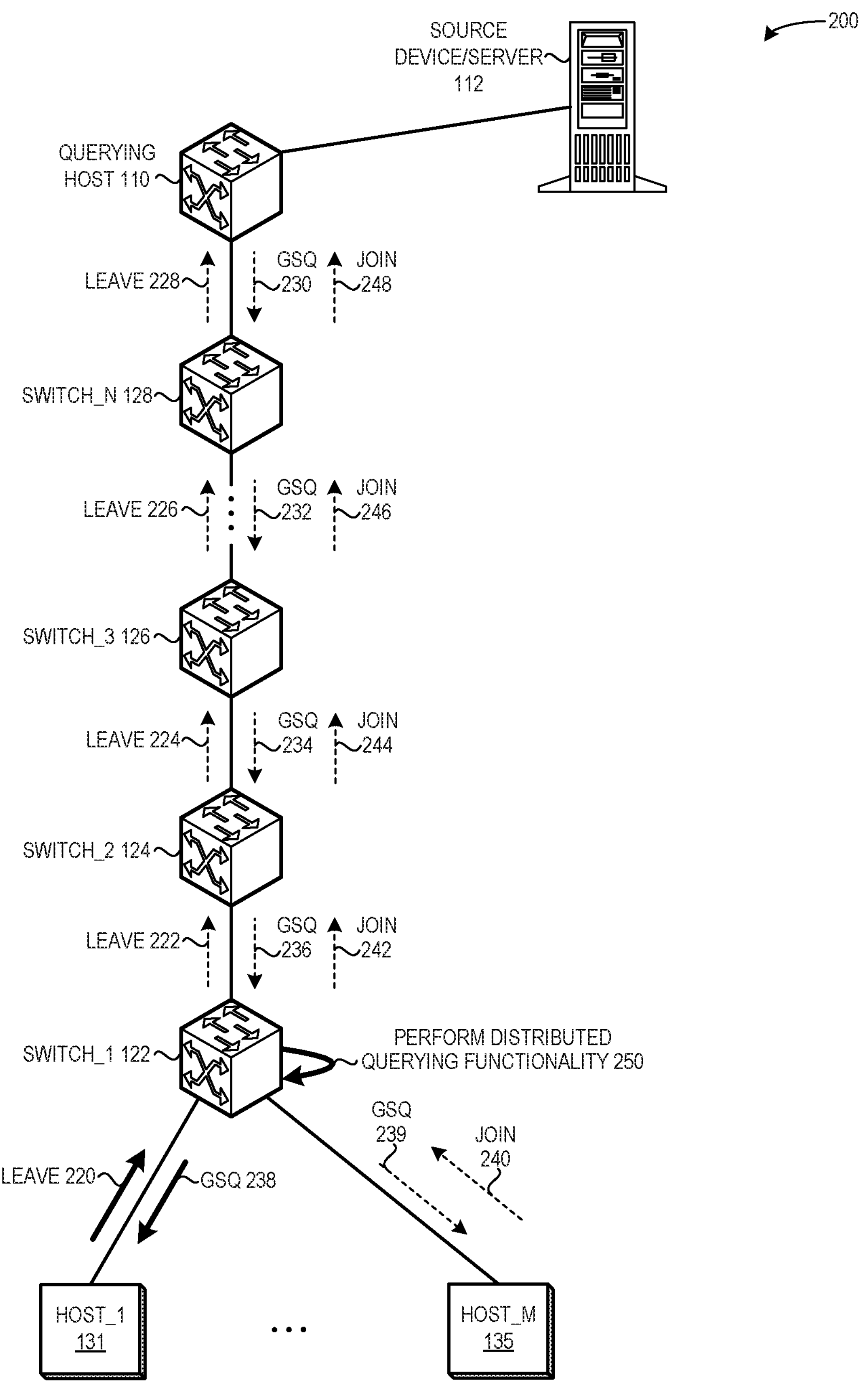
FIG. 2 illustrates an environment which facilitates reducing control plane traffic in a network, including a distributed querying host functionality, in accordance with an aspect of the present application.

Environment which Facilitates Reducing Control Plane Traffic: Distributed Querying Host Functionality FIG. 2 illustrates an environment 200 which facilitates reducing control plane traffic in a network, including a distributed querying host functionality, in accordance with an aspect of the present application. Similar to environment 100, environment 200 can include: source device/server 112 which sends data to subscribed hosts; querying host 110 which can be a designated router, switch, or other network device responsible for, e.g., periodically sending queries in an IGMP environment; intermediate switches 122-128; and a plurality of clients or hosts connected to a network device which serves as the next-hop switch for the connected clients or hosts, e.g., host_1 131 and host_M 135, which are connected to switch_1 122 as their next-hop switch.

If a subscribed host or member of a multicast group wishes to leave the group (e.g., change channels in the IPTV scenario), many messages may be exchanged between querying host 110 and both the leaving host and all other hosts in the same multicast group. For example, if host_1 131 sends a leave 220 message to querying host 110, leave 220 can be propagated upstream to querying host 110 via intermediate switches 124, 126, and 128, as, respectively, a leave 222 message, a leave 224 message, a leave 226 message, and a leave 228 message. In response to leave 228, querying host 110 can send a group-specific query (GSQ) 230 message back to all hosts in the subscribed group. GSQ 230 can be propagated downstream to switch_1 122 via intermediate switches 128, 126, 124, and 122, as, respectively, GSQ 230, a GSQ 232, a GSQ 234, and a GSQ 236. Upon receiving GSQ 236, switch_1 122 can send GSQ 238 and GSQ 239 to, respectively, host_1 131 and host_M 135. Assuming that either host_1 131 is a single client or that no other clients associated with host_1 131 wish to stay subscribed to the group, if host_M 135 wishes to remain subscribed to the group, host_M 135 can send a join 240 message back to querying host 110 in response to GSQ 239. Join 240 can be propagated upstream to querying host 110 via intermediate switches 124, 126, and 128, as, respectively, a join 242 message, a join 244 message, a join 246 message, and a join 248 message.

Thus, at least three sets of messages may be propagated through the network when a single host sends a leave message, e.g.: leave messages 220 and 222-228 (indicated by dashed lines), GSQs 230-236 and 239 (indicated by dashed lines) and GSQ 238, and join messages 240-248 (indicated by dashed lines). As with the AHQ and join messages described above in relation to FIG. 1, in a scaled network topology where multiple multicast clients or hosts are subscribed to multiple multicast groups, a single leave can trigger multiple triple sets of messages for the same multicast group, which can result in a significant amount of packets exchanged on the path between the clients and querying host 110. The potentially voluminous amount of these messages may increase the latency at all cascaded levels, which may contribute to the delayed handling of multicast packets by the intermediate network devices (e.g., switches 122-128), which in turn can result in decreased performance and efficiency in the network due to the significant amount of control plane traffic.

The described aspects address this issue by distributing some responsibilities of centralized querying host 110 to each intermediate switch, which can result in partial load sharing of the responsibilities of querying host 110. For example, when switch_1 122 receives leave 220 from host_1 131, switch_1 122 can check whether the group has multiple clients (e.g., if other ports or hosts are still subscribed to the multicast group). If so, switch_1 131 can generate and send GSQ 238 only on the port on which leave 220 was received (the "leave-received port"), which allows any other clients or host connected to that port (i.e., associated with host_1 131) to send a join back if desired (not shown). Thus, switch_1 122 can perform a distributed querying functionality (operation 250), which can result in eliminating the propagation of the triple set of messages (shown with dashed lines). That is: leave 220 is not forwarded upstream from switch_1 122 to querying host 110 and propagated through intermediate switches 124-128, which eliminates leave messages 222-228; GSQ 238 is sent directly from switch_1 122 instead of being propagated from querying host 110 through intermediate switches 128-122, which eliminates GSQ messages 230-236 and 239; and host_M 135, which is still connected, need not receive GSQ 239 and respond with join 240, which eliminates GSQ 239 and join messages 240-248.

Thus, distributing some of the responsibilities of querying host 110 to each intermediate switch (e.g., operation 250) can result in a significant reduction of control plane traffic in the network.

Method which Facilitates Reducing Control Plane Traffic in a Network

Figure 3:
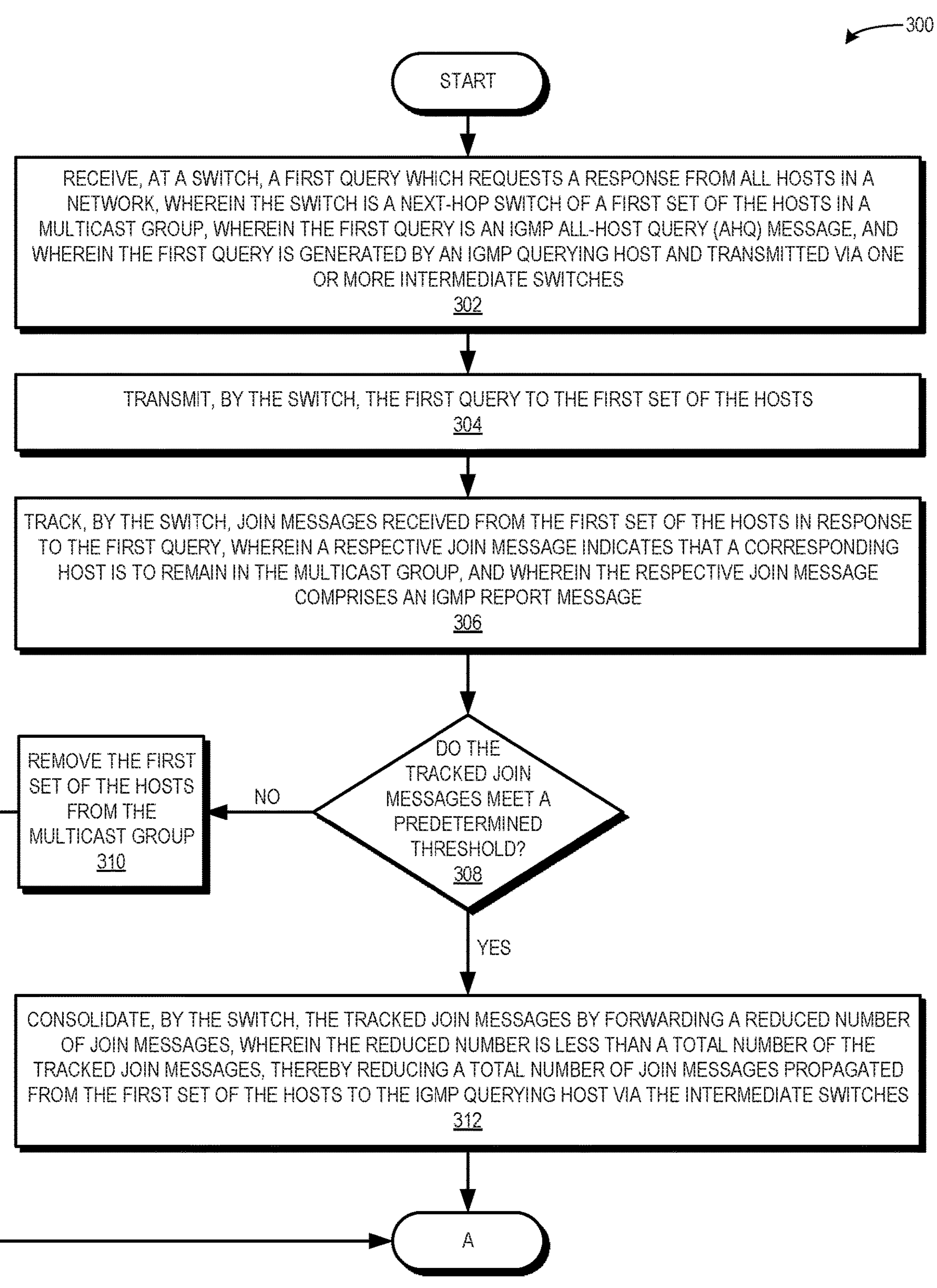
FIG. 3 presents a flowchart illustrating a method which facilitates reducing control plane traffic in a network, including selective join forwarding, in accordance with an aspect of the present application.

FIG. 3 presents a flowchart 300 illustrating a method which facilitates reducing control plane traffic in a network, including selective join forwarding, in accordance with an aspect of the present application. During operation, the system receives, at a switch, a first query which requests a response from all hosts in the network, wherein the switch is a next-hop switch of a first set of the hosts in a multicast group, wherein the first query is an IGMP all-host query (AHQ) message, and wherein the first query is generated by an IGMP querying host and transmitted via one or more intermediate switches (operation 302). The system transmits, by the switch, the first query to the first set of the hosts (operation 304). The system tracks, by the switch, join messages received from the first set of the hosts in response to the first query, wherein a respective join message indicates that a corresponding host is to remain in the multicast group, and wherein the respective join message comprises an IGMP report message (operation 306).

Figure 4:
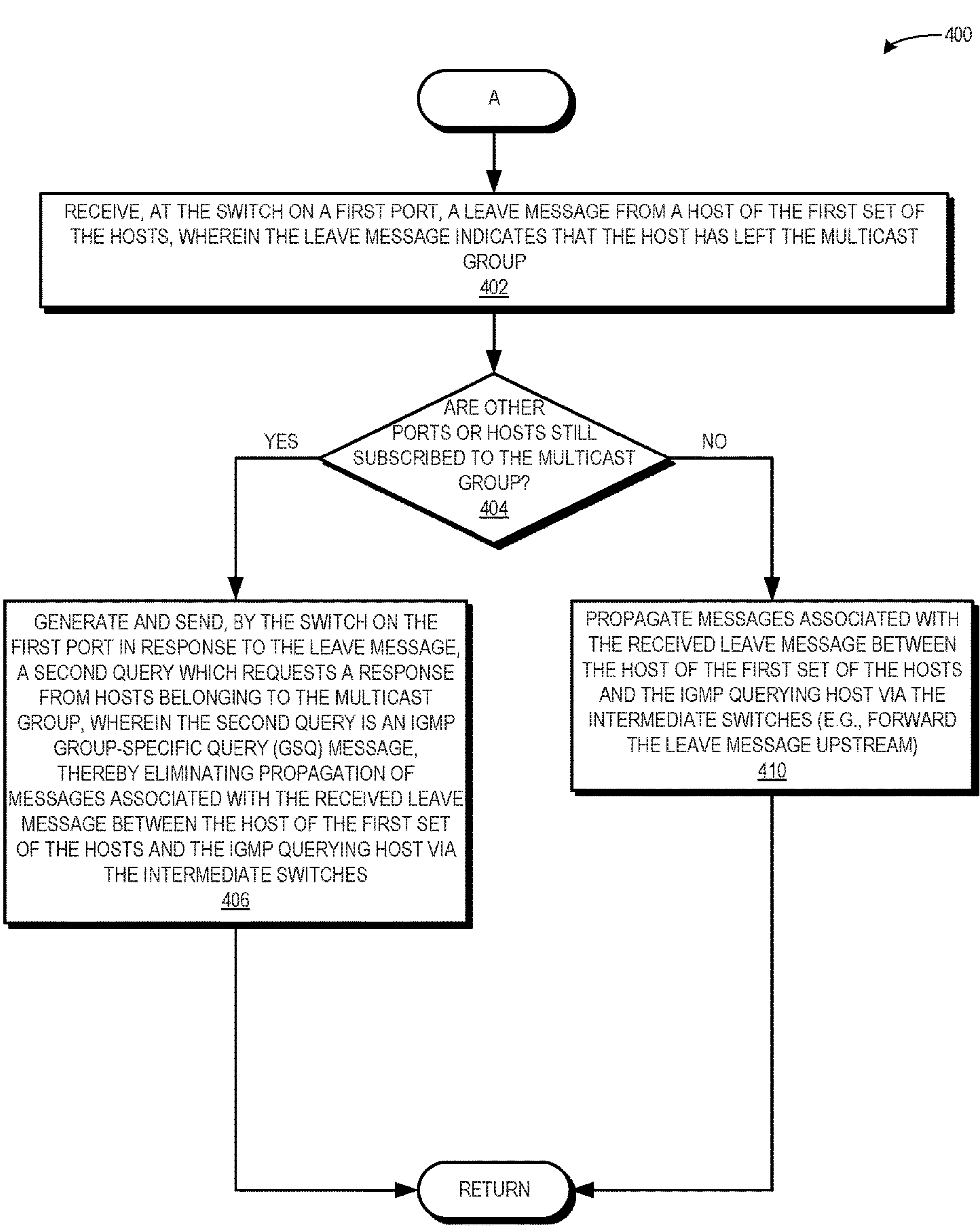
FIG. 4 presents a flowchart illustrating a method which facilitates reducing control plane traffic in a network, including a distributed querying host functionality, in accordance with an aspect of the present application.

If the tracked join messages do not meet a predetermined threshold (decision 308), the system removes the first set of the hosts from the multicast group (operation 310) and the operation continues at Label A of FIG. 4. If the tracked join messages meet the predetermined threshold (decision 308), the system consolidates, by the switch, the tracked join messages by forwarding a reduced number of join messages, wherein the reduced number is less than a total number of the tracked join messages, which results in (i.e., thereby) reducing a total number of join messages propagated from the first set of the hosts to the IGMP querying host via the intermediate switches (operation 312). The operation continues at Label A of FIG. 4.

FIG. 4 presents a flowchart 400 illustrating a method which facilitates reducing control plane traffic in a network, including a distributed querying host functionality, in accordance with an aspect of the present application. The system receives, at the switch on a first port, a leave message from a first host of the first set of the hosts, wherein the leave message indicates that the first host has left the multicast group (operation 402). If other ports or hosts (e.g., at least one other port or host) are still subscribed to the multicast group (decision 404), the system generates and sends, by the switch on the first port in response to the leave message, a second query which requests a response from hosts (i.e., each host) belonging to the multicast group, wherein the second query is an IGMP group-specific query message, thereby eliminating propagation of messages associated with the received leave message between the host and the IGMP querying host via the intermediate switches (operation 406). If no other ports or hosts (e.g., at least one other port or host) are still subscribed to the multicast group (decision 404), the system propagates messages associated with the received leave message between the host of the first set of the hosts and the IGMP querying host via the intermediate switches (e.g., forwards the leave message upstream) (operation 410). The operation returns.

While the operations of FIGS. 3 and 4 are depicted in a particular order, the selective join forwarding operations of FIG. 3 may occur prior to, during, or after the distributed querying host operations of FIG. 4.

Technological Solution to Problem in the Software Arts

The described aspects provide a specific implementation and technological solution (reducing control plane traffic in a network) to a technological problem in the computer arts (efficient flow of traffic in a network which includes multiple hosts subscribed to multicast groups via cascaded intermediate switches using IGMP). The described aspects further integrate into a practical application because they are necessarily rooted in computer technology in order to overcome a problem specifically arising in the realm of computer networks.

Figure 5:
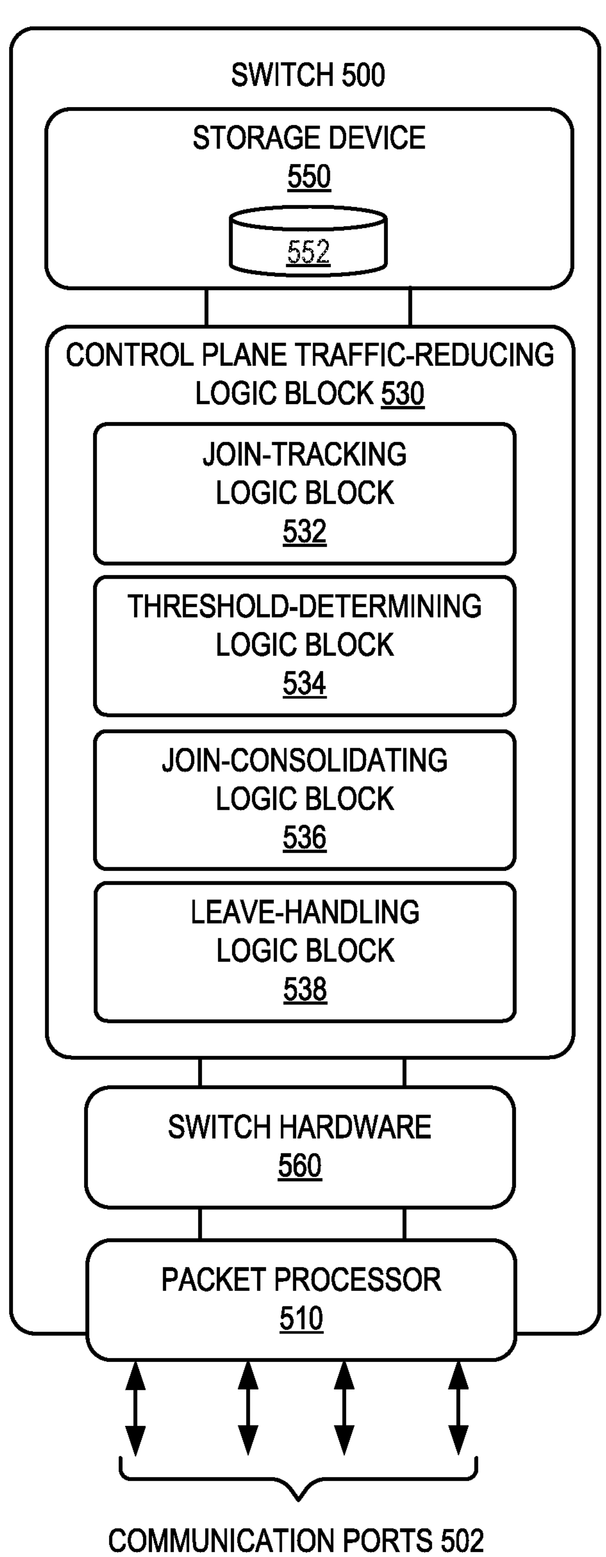
FIG. 5 illustrates a network device or a computing system (e.g., a switch) which facilitates reducing control plane traffic in a network, in accordance with an aspect of the present application.

Network Device or Computing System which Facilitates Reducing Control Plane Traffic in a Network FIG. 5 illustrates a network device or a computing system 500 (e.g., a switch) which facilitates reducing control plane traffic in a network, in accordance with an aspect of the present application. Switch 500 can include a number of communication ports 502, a packet processor 510, and a storage device 550. Switch 500 can also include switch hardware 560 (e.g., processing hardware of switch 500, such as its application-specific integrated circuit (ASIC) chips), which includes information based on which switch 500 processes packets (e.g., determines output ports for packets). Packet processor 510 can extract and process header information from the received packets. Packet processor 510 can identify a switch identifier (e.g., a Media Access Control (MAC) address and/or an Internet Protocol (IP) address) associated with switch 500 in the header of a packet.

Communication ports 502 can include inter-switch communication channels for communication with other switches, user devices, and network devices. The communication channels can be implemented via a regular communication port and based on any open or proprietary format. Communication ports 502 can include one or more Ethernet ports capable of receiving frames encapsulated in an Ethernet header. Communication ports 502 can also include one or more IP ports capable of receiving IP packets. An IP port is capable of receiving an IP packet and can be configured with an IP address. Packet processor 510 can process Ethernet frames and/or IP packets. A respective port of communication ports 502 may operate as an ingress port and/or an egress port.

Switch 500 can maintain a database 552 (e.g., in storage device 550). Database 552 can be a relational database and may run on one or more Database Management System (DBMS) instances. Database 552 can store information associated with routing, configuration, and interfaces of switch 500. Switch 500 can include a control plane traffic-reducing logic block 530 that can facilitate reducing control plane traffic in a network, as described herein. Control plane traffic-reducing logic block 530 can include: a join-tracking logic block 532; a threshold-determining logic block 534; a join-consolidating logic block 536; and a leave-handling logic block 538. Packet processor 510 can receive a first query which requests a response from all hosts in the network, wherein the switch is a next-hop switch of a first set of the hosts in a multicast group, wherein the first query is an IGMP all-host query message, and wherein the first query is generated by an IGMP querying host and transmitted via one or more intermediate switches. Join-tracking logic block 532 can track join messages received from the first set of the hosts in response to the first query, wherein a respective join message indicates that a corresponding host is to remain in the multicast group, and wherein the respective join message comprises an IGMP report message. Threshold-determining logic block 534 can determine that the tracked join messages meet a predetermined threshold. Join-consolidating logic block 536 can, responsive to threshold-determining logic block determining that the tracked join messages meet the predetermined threshold, consolidate the tracked join messages by forwarding a reduced number of join messages, wherein the reduced number is less than a total number of the tracked join messages, thereby reducing a total number of join messages propagated from the first set of the hosts to the IGMP querying host via the intermediate switches.

Packet processor 510 can receive, on a first port, a first leave message from a first host of the first set of the hosts, wherein the leave message indicates that the first host has left the multicast group. Leave-handling logic block 538 can determine that at least one other port or host is subscribed to the multicast group. Leave-handling logic block 538 can also send, on the first port in response to the first leave message, a second query which requests a response from hosts (i.e., each host) belonging to the multicast group, wherein the second query is an IGMP group-specific query message, thereby eliminating propagation of messages associated with the received first leave message between the first host and the IGMP querying host via the intermediate switches.

In general, the disclosed aspects provide a method, a switch, and a non-transitory storage medium for facilitating reducing control plane traffic in a network. During operation, the system receives, at a switch, a first query which requests a response from all hosts in the network, wherein the switch is a next-hop switch of a first set of the hosts in a multicast group, wherein the first query is an Internet Group Management Protocol (IGMP) all-host query message, and wherein the first query is generated by an IGMP querying host and transmitted via one or more intermediate switches. The system tracks, by the switch, join messages received from the first set of the hosts in response to the first query, wherein a respective join message indicates that a corresponding host is to remain in the multicast group, and wherein the respective join message comprises an IGMP report message. Responsive to determining that the tracked join messages meet a predetermined threshold, the system consolidates, by the switch, the tracked join messages by forwarding a reduced number of join messages, wherein the reduced number is less than a total number of the tracked join messages, thereby reducing a total number of join messages propagated from the first set of the hosts to the IGMP querying host via the intermediate switches.

In a variation on this aspect, the system transmits, by the switch, the first query to the first set of the hosts.

In a further variation on this aspect, the system determines that the tracked join messages meet the predetermined threshold by: maintaining a timer based on transmitting the first query and receiving the join messages; tracking a number of received join messages; and determining an expiration of the timer, wherein the tracked number of received join messages exceeding a preconfigured number prior to or at the expiration of the timer comprises the predetermined threshold.

In a further variation, the system determines that the tracked join messages meets the predetermined threshold by: responsive to transmitting the first query, setting a counter to the reduced number; responsive to receiving a join message in response to the first query, decrementing the counter; and determining that the counter is equal to a value of zero, wherein the determination that the counter is equal to the value of zero comprises the predetermined threshold.

In a further variation, the reduced number corresponds to a robustness variable associated with the IGMP querying host.

In a further variation, the system receives, at the switch on a first port, a first leave message from a first host of the first set of hosts, wherein the leave message indicates that the first host has left the multicast group. The system determines that at least one other port or host is subscribed to the multicast group. The system sends, by the switch on the first port in response to the first leave message, a second query which requests a response from each host belonging to the multicast group, wherein the second query is an IGMP group-specific query message, thereby eliminating propagation of messages associated with the received first leave message between the first host and the IGMP querying host via the intermediate switches.

In a further variation, the system receives, at the switch on a second port, a second leave message from a second host of the first set of hosts, wherein the second leave message indicates that the second host has left the multicast group. Responsive to determining that no other ports or hosts are subscribed to the multicast group, the system propagates messages associated with the received second leave message between the second host and the IGMP querying host via the intermediate switches.

In a further variation, the eliminated messages associated with the received first leave message and the propagated messages associated with the received second leave message include: leave messages transmitted to the IGMP querying host via the intermediate switches; group-specific query messages transmitted from the IGMP querying host to every other host in the multicast group via the intermediate switches; and report messages transmitted from the other hosts in the multicast group to the IGMP querying host via the intermediate switches.

In another aspect, a switch comprises: processing circuitry; forwarding hardware; a plurality of ports; a packet processor to receive a first query which requests a response from all hosts in the network, wherein the switch is a next-hop switch of a first set of the hosts in a multicast group, wherein the first query is an Internet Group Management Protocol (IGMP) all-host query message, and wherein the first query is generated by an IGMP querying host and transmitted via one or more intermediate switches; a join-tracking logic block to track join messages received from the first set of the hosts in response to the first query, wherein a respective join message indicates that a corresponding host is to remain in the multicast group, and wherein the respective join message comprises an IGMP report message; a threshold-determining logic block to determine that the tracked join messages meet a predetermined threshold; and a join-consolidating logic block to, responsive to the threshold-determining logic block determining that the tracked join messages meet the predetermined threshold, consolidate the tracked join messages by forwarding a reduced number of join messages, wherein the reduced number is less than a total number of the tracked join messages, thereby reducing a total number of join messages propagated from the first set of the hosts to the IGMP querying host via the intermediate switches. The logic blocks can perform the methods and operations described above, including in relation to FIGS. 1-5.

In a variation on this aspect, the packet processor is further to receive, on a first port, a first leave message from a first host of the first set of the hosts, wherein the leave message indicates that the first host has left the multicast group. The switch further comprises a leave-handling logic block to determine that at least one other port or host is subscribed to the multicast group. The packet processor is further to send, on the first port in response to the first leave message, a second query which requests a response from each host belonging to the multicast group, wherein the second query is an IGMP group-specific query message, thereby eliminating propagation of messages associated with the received first leave message between the first host and the IGMP querying host via the intermediate switches.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method for reducing control plane traffic in a network, the method comprising:

receiving, at a switch, a first query which requests a response from all hosts in the network; and transmitting, by the switch, the first query to the first set of the hosts, wherein the switch is a next-hop switch of a first set of the hosts in a multicast group, wherein the first query is an Internet Group Management Protocol (IGMP) all-host query message, and wherein the first query is generated by an IGMP querying host and transmitted via one or more intermediate switches;

tracking, by the switch, join messages received from the first set of the hosts in response to the first query, wherein a respective join message indicates that a corresponding host is to remain in the multicast group, and wherein the respective join message comprises an IGMP report message;

maintaining a timer based on transmitting the first query and receiving the join messages;

tracking a number of received join messages; and determining an expiration of the timer, wherein the tracked number of received join messages exceeding a preconfigured number prior to or at the expiration of the timer comprises a predetermined threshold; and responsive to determining that the tracked join messages meet the predetermined threshold, consolidating, by the switch, the tracked join messages by forwarding a reduced number of join messages, wherein the reduced number is less than a total number of the tracked join messages, thereby reducing a total number of join messages propagated from the first set of the hosts to the IGMP querying host via the intermediate switches.

2. The method of claim 1, wherein the reduced number corresponds to a robustness variable associated with the IGMP querying host.

3. The method of claim 1, further comprising:

receiving, at the switch on a first port, a first leave message from a first host of the first set of the hosts, wherein the leave message indicates that the first host has left the multicast group;

determining that at least one other port or host is subscribed to the multicast group; and sending, by the switch on the first port in response to the first leave message, a second query which requests a response from each host belonging to the multicast group, wherein the second query is an IGMP group-specific query message, thereby eliminating propagation of messages associated with the received first leave message between the first host and the IGMP querying host via the intermediate switches.

4. The method of claim 3, further comprising:

receiving, at the switch on a second port, a second leave message from a second host of the first set of the hosts, wherein the second leave message indicates that the second host has left the multicast group; and responsive to determining that no other ports or hosts are subscribed to the multicast group, propagating messages associated with the received second leave message between the second host and the IGMP querying host via the intermediate switches.

5. The method of claim 4, wherein the eliminated messages associated with the received first leave message and the propagated messages associated with the received second leave message include:

leave messages transmitted to the IGMP querying host via the intermediate switches;

group-specific query messages transmitted from the IGMP querying host to every other host in the multicast group via the intermediate switches; and report messages transmitted from every other host in the multicast group to the IGMP querying host via the intermediate switches.

6. A switch, comprising:

processing circuitry;

forwarding hardware;

a plurality of ports;

a packet processor to:

receive a first query which requests a response from all hosts in the network; and transmit the first query to the first set of the hosts, wherein the switch is a next-hop switch of a first set of the hosts in a multicast group, wherein the first query is an Internet Group Management Protocol (IGMP) all-host query message, and wherein the first query is generated by an IGMP querying host and transmitted via one or more intermediate switches;

a join-tracking logic block to track join messages received from the first set of the hosts in response to the first query, wherein a respective join message indicates that a corresponding host is to remain in the multicast group, and wherein the respective join message comprises an IGMP report message;

a threshold-determining logic block to:

maintain a timer based on transmitting the first query and receiving the join messages;

track a number of received join messages;

determine an expiration of the timer; and determine that the tracked join messages meet a predetermined threshold, wherein the tracked number of received join messages exceeding a preconfigured number prior to or at the expiration of the timer comprises the predetermined threshold; and a join-consolidating logic block to, responsive to the threshold-determining logic block determining that the tracked join messages meet the predetermined threshold, consolidate the tracked join messages by forwarding a reduced number of join messages, wherein the reduced number is less than a total number of the tracked join messages, thereby reducing a total number of join messages propagated from the first set of the hosts to the IGMP querying host via the intermediate switches.

7. The switch of claim 6, wherein the reduced number corresponds to a robustness variable associated with the IGMP querying host.

8. The switch of claim 6, wherein the packet processor is further to receive, on a first port, a first leave message from a first host of the first set of the hosts, wherein the leave message indicates that the first host has left the multicast group;

wherein the switch further comprises a leave-handling logic block to determine that at least one other port or host is subscribed to the multicast group; and wherein the packet processor is further to send, on the first port in response to the first leave message, a second query which requests a response from each host belonging to the multicast group, wherein the second query is an IGMP group-specific query message, thereby eliminating propagation of messages associated with the received first leave message between the first host and the IGMP querying host via the intermediate switches.

9. The switch of claim 8, wherein the packet processor is further to:

receive, on a second port, a second leave message from a second host of the first set of the hosts, wherein the second leave message indicates that the second host has left the multicast group; and responsive to the leave-handling logic block determining that no other ports or hosts are subscribed to the multicast group, propagate messages associated with the received second leave message between the second host and the IGMP querying host via the intermediate switches.

10. The switch of claim 9, wherein the eliminated messages associated with the received first leave message and the propagated messages associated with the received second leave message include:

leave messages transmitted to the IGMP querying host via the intermediate switches;

group-specific query messages transmitted from the IGMP querying host to every other host in the multicast group via the intermediate switches; and report messages transmitted from every other host in the multicast group to the IGMP querying host via the intermediate switches.

11. A non-transitory computer-readable storage medium storing instructions that when executed by a computer cause the computer to perform a method, the method comprising:

receiving, at a switch, a first query which requests a response from all hosts in the network; and transmitting, by the switch, the first query to the first set of the hosts, wherein the switch is a next-hop switch of a first set of the hosts in a multicast group, wherein the first query is an Internet Group Management Protocol (IGMP) all-host query message, and wherein the first query is generated by an IGMP querying host and transmitted via one or more intermediate switches;

tracking, by the switch, join messages received from the first set of the hosts in response to the first query, wherein a respective join message indicates that a corresponding host is to remain in the multicast group, and wherein the respective join message comprises an IGMP report message;

maintaining a timer based on transmitting the first query and receiving the join messages;

tracking a number of received join messages;

determining an expiration of the timer, wherein the tracked number of received join messages exceeding a preconfigured number prior to or at the expiration of the timer comprises a predetermined threshold; and responsive to determining that the tracked join messages meet the predetermined threshold, consolidating, by the switch, the tracked join messages by forwarding a reduced number of join messages, wherein the reduced number is less than a total number of the tracked join messages, thereby reducing a total number of join messages propagated from the first set of the hosts to the IGMP querying host via the intermediate switches.

12. The non-transitory computer-readable storage medium of claim 11, wherein the reduced number corresponds to a robustness variable associated with the IGMP querying host.

* * * * *